United States Patent [19]

Malloy et al.

[11] Patent Number: 5,385,705
[45] Date of Patent: Jan. 31, 1995

[54] REUSABLE CORE APPARATUS FOR A CASTING MOLD, AND METHODS OF UTILIZING SAME

[76] Inventors: Gary J. Malloy, 410 Weatherhead St.; David W. Jaeger, 3935 S. State Rd., both of Angola, Ind. 46703

[21] Appl. No.: 41,159

[22] Filed: Apr. 11, 1993

[51] Int. Cl.⁶ .............................................. B29C 33/76
[52] U.S. Cl. .................................. 264/219; 164/137; 164/342; 249/184; 249/186; 425/186; 425/468
[58] Field of Search .............. 164/137, 342; 264/219; 249/184, 186; 425/182, 186, 457, 468, 577, DIG. 33

[56] References Cited

U.S. PATENT DOCUMENTS

| | | | |
|---|---|---|---|
| 1,347,575 | 7/1920 | Bungay | 249/186 |
| 1,931,587 | 10/1933 | McConnel | 249/186 |
| 2,079,393 | 5/1937 | Benge | 249/184 |
| 3,545,718 | 12/1970 | Shale | 249/184 |
| 3,746,493 | 7/1973 | Stalter | 425/577 |
| 3,910,748 | 10/1975 | Kopernik | 425/DIG. 33 |
| 3,961,013 | 6/1976 | Gütlhuber et al. | 249/184 |
| 4,184,834 | 1/1980 | Barber | 425/577 |
| 5,176,866 | 1/1993 | Tanaka et al. | 249/62 |

FOREIGN PATENT DOCUMENTS

| | | | |
|---|---|---|---|
| 46-24546 | 7/1971 | Japan | 425/577 |
| 53-4543 | 2/1978 | Japan | 425/577 |
| 53-127559 | 11/1978 | Japan | 425/577 |

Primary Examiner—Jay H. Woo
Assistant Examiner—Robert B. Davis
Attorney, Agent, or Firm—Irving M. Weiner; Joseph P. Carrier; Pamela S. Burt

[57] ABSTRACT

Reusable core apparatus for a casting mold is disclosed. The apparatus includes a first core mechanism for being disposed in a casting cavity of the mold to define a first internal casting surface within the cavity, a second core mechanism for being disposed in the casting cavity to define a second internal casting surface in the casting cavity, and a securing mechanism for securing the first and second core mechanisms together in a predetermined engaging relationship within the casting cavity. The securing mechanism is adapted to maintain the first and second core mechanisms in the predetermined engaging relationship while an article is being cast in the mold and to release the first an second core mechanisms from the predetermined engaging relationship after the casting process so that the first and second core mechanisms may be directly and easily disengaged with each other and from a cast part so that the first and second core mechanisms may be reused in casting additional parts.

19 Claims, 2 Drawing Sheets

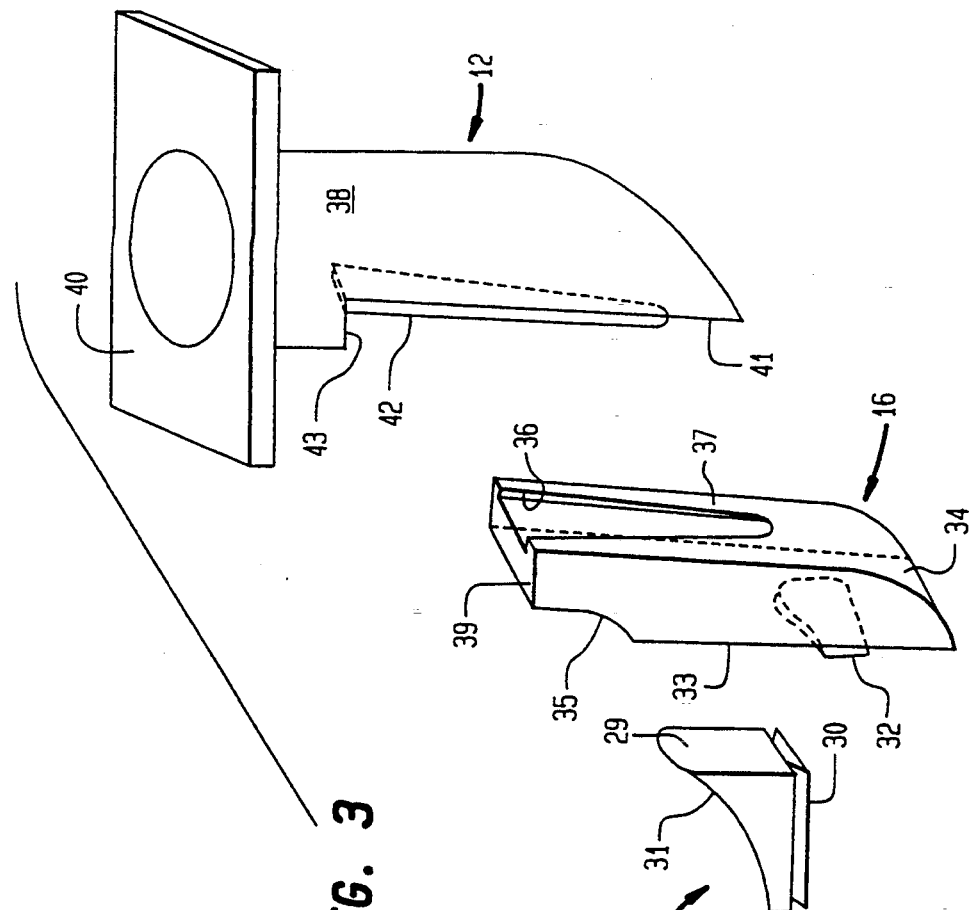

REUSABLE CORE APPARATUS FOR A CASTING MOLD, AND METHODS OF UTILIZING SAME

BACKGROUND OF THE INVENTION

1. Field of the Invention

The invention relates to core apparatus for use in a casting mold, and to methods of utilizing same. More particularly, the invention pertains to reusable core apparatus for defining internal casting surfaces in a casting mold, and to methods of utilizing such reusable core apparatus.

2. Description Of Relative Art

There are many known methods and apparatus for casting articles made of various materials, including methods and apparatus in the aluminum die casting, plastic injection molding, and permanent molding industries. Further, there are known methods and apparatus for casting articles of various materials in which the cast articles have internal surfaces formed as the article is being cast. In such known methods and apparatus, the internal surfaces of the cast article will typically be defined by non-reusable core inserts which are adapted to be disposed and arranged within a casting cavity of a casting mold. Often the cast article will have a plurality of internal surfaces extending in a predetermined relationship to each other or a complex internal surface, such as a cast article with an internal surface having a constant radius with a long side and a short side. In such instances it is, again, typically necessary to use one or more non-reusable inserts which would be placed in the casting mold to define the internal casting surfaces, which inserts would be discarded after one use.

Such known methods and apparatus are disadvantageous because the core inserts used in such conventional methods and apparatus are used only once during a single casting process, resulting in increased cost for the cast articles.

Additionally, problems often arise with the disposition and arrangement of the core non-reusable inserts in a mold cavity such that the mold inserts are not accurately maintained in position during a casting process so that cast parts are correspondingly formed with imperfections.

The present invention has been developed to overcome such disadvantages of the conventional methods and apparatus, and to generally fulfill a great need in the art by providing a method and apparatus for casting articles with internal surfaces, wherein the complete casting apparatus, including core inserts, is reusable, and hence can be economically used for casting numerous parts.

SUMMARY OF THE INVENTION

According to the invention there is provided reusable core apparatus for use in a casting mold having a mold member with a casting cavity defined therein, the core apparatus comprising first core means for being disposed in the casting cavity to define a first internal casting surface within the casting cavity, second core means for being disposed in the casting cavity to define a second internal casting surface within the casting cavity, and means for selectively securing the first and second core means together in a predetermined engaging relationship within the casting cavity. The securing means is adapted to maintain the first and second core means in the predetermined engaging relationship while an article is being cast in the mold and to release the first and second core means from the predetermined engaging relationship after the article is cast so that both the first and second core means may be reused for casting additional articles in the mold.

The first core means preferably includes a plurality of movable cores provided with powered actuators for moving the cores into and out of the casting cavity with great force, the second core means preferably includes a plurality of loose pieces, and the securing means preferably includes cooperating joint members formed integrally with surfaces of the movable cores and the loose pieces for separately securing each of the loose pieces in the predetermined engaging relationship with the moveable cores.

Additionally, the securing means will also preferably include means for loosely maintaining the first and second core means in a temporary engaging relationship while at least one of the moveable cores is being positioned in the mold cavity; and at least one of the cooperating joint members will preferably have a tapered surface to facilitate alignment with another of the cooperating joint members.

According to a preferred embodiment of the invention reusable, loose piece, core inserts and associated slide core members are provided with a novel interlocking mechanism which permits the loose piece inserts to be easily and accurately arranged relative to the slide core members during a mold assembly process, which securely maintains loose piece inserts in a predetermined relationship with the slide core members during a casting process, and which permits the loose piece inserts to be easily disengaged from the slide core members and from a cast article after the casting process so that the loose piece inserts may be advantageously reused in subsequent casting processes.

According to the invention there is also provided a method for casting a part having an internal cast surface, comprising the steps of: providing a casting member having a casting cavity therein; providing first and second reusable core means; providing means for aligning the first and second reusable core means during assembly together and for securing the first and second reusable core means together in a predetermined engaging relationship in said casting cavity while a part is being cast, the aligning and securing means consisting of cooperating joint members formed integrally with the first and second reusable core means; partially positioning the first reusable core means in the casting cavity; fitting the second reusable core means to the first reusable core means by engaging the cooperating joint members together in a temporary engaging relationship; fully positioning the first reusable core means in the cavity such that the cooperating joint members are moved relative to each other out of the temporary engaging relationship into the predetermined engaging relationship to define an internal casting surface within the casting cavity; casting a part in the casting cavity, the part having an internal cast surface defined by the first and second reusable core means; and removing the first reusable core means from the part and the casting cavity independently of the second reusable core means.

It is an object of the present invention to provide core apparatus in a casting mold for casting articles with internal casting surfaces, wherein all parts of the core apparatus are reusable.

It is another object of the present invention to provide such core apparatus which can be quickly, easily and reliably assembled and disassembled for use in casting articles. It is yet another object of the present invention to provide such core apparatus which is reliably maintained in proper position within a casting mold during a casting process for assuring high quality of cast parts.

It is still another object of the present invention to provide such a casting mold having excellent durability and capable of casting high quality articles over an extended period of time.

Other objects, advantages and salient features of the present invention will become apparent from the following detailed description which, when taken into conjunction with the annexed drawings, discloses a preferred embodiment of the present invention.

BRIEF DESCRIPTION OF THE DRAWINGS

FIG. 2 is a plan view of core apparatus, as assembled together, according to the prefered embodiment of the invention and which is adapted to be received in the ejector half cavity of FIG. 1 for defining internal casting surfaces of the casting mold.

FIG. 3 is a perspective exploded view of the several parts of the core apparatus of FIG. 2 showing structural details thereof.

DETAILED DESCRIPTION OF A PREFERRED EMBODIMENT

Figure 1:
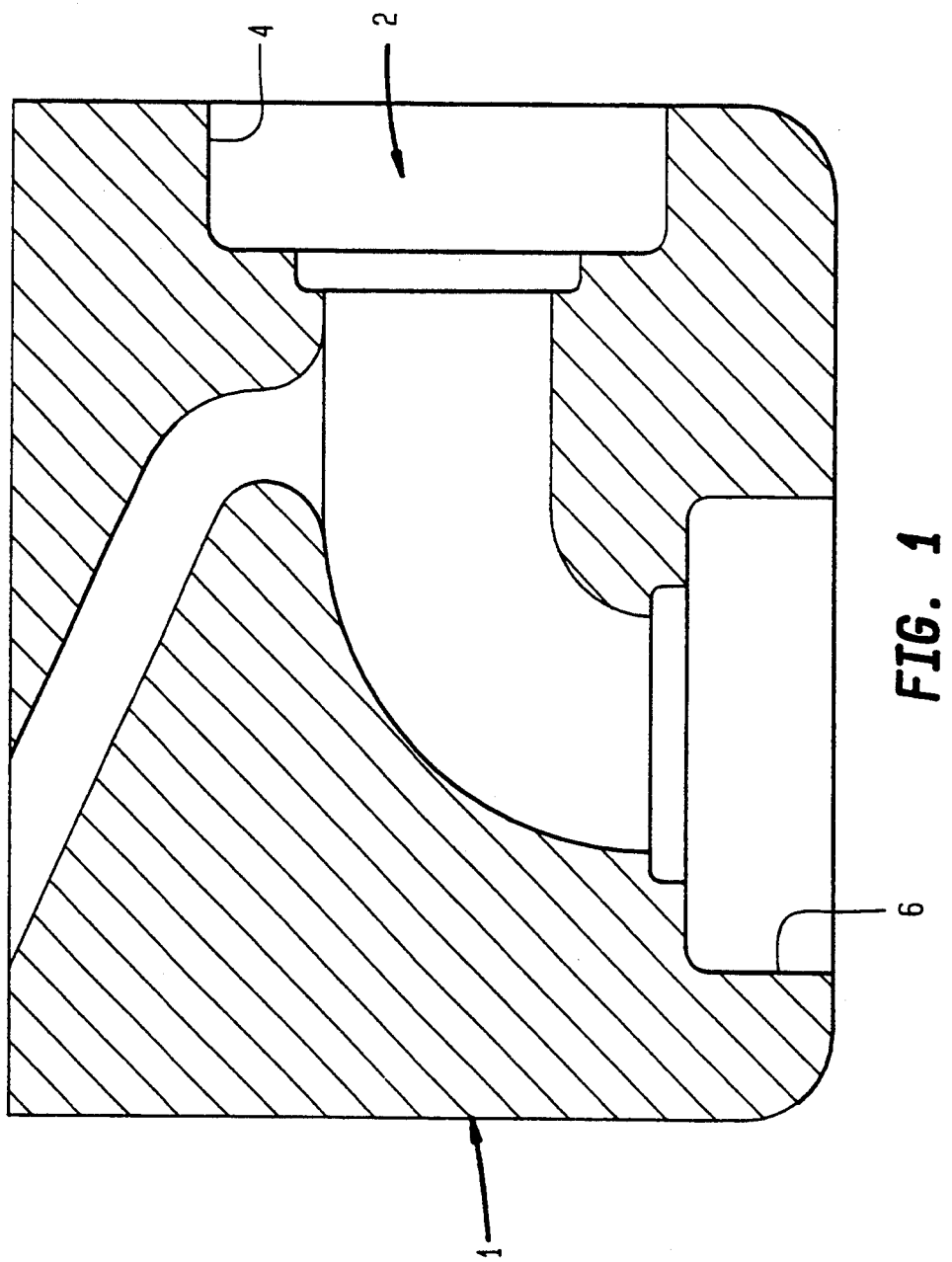
FIG. 1 is a top plan view of an ejector half cavity of a casting mold adapted to receive core apparatus according to a prefered embodiment of the invention.

Referring to FIG. 1 there is shown, in plan, a half 1 of a casting mold adapted to receive core apparatus according to the invention, the mold half 1 having a casting cavity 2 defined therein. The mold half 1 also has openings 4, 6 defined therein, which are adapted to receive reusable core members of the core apparatus according to the invention, while a mating mold half (not shown) with a cavity defined therein would be provided over the half 1 for enclosing the core apparatus therebetween. The mold half 1 is shown in simplified form.

Referring to FIGS. 2-3 there are shown reusable core members 10, 12, 14, 16 according to a preferred embodiment of the invention, the core members 10-16 being adapted to be assembled together and to be disposed in the cavities of the mold halves for defining internal casting surfaces of the casting mold. As shown in FIG. 2, the reusable core members are adapted to be assembled together substantially in the shape of a 90° L-shaped elbow with a substantially circular cross section. The 90° elbow has a substantially constant radius, wherein the external or longer side thereof is primarily defined by the core members 10, 12 and the internal or shorter side thereof is primarily defined by the core members 14, 16.

The core members 10, 12 are preferably fixed to respective powered actuators 8, 9 which are partially shown if FIG. 2, so that the core members 10, 12 can be axially moved into and out of the ejector cavity with great force; while the core members 14, 16 as shown in FIG. 3 are loose piece inserts which are adapted to be assembled (manually or automatically) with the members 10, 12, as discussed further hereinbelow.

It will be understood that the invention is not limited to a core apparatus including two movable cores and two loose piece inserts which are adapted to be connected together to define one or more inner casting surfaces of a given shape in articles to be cast in the mold.

Rather, the present invention encompasses all types of core apparatus for casting molds in which one or more reusable movable cores are assembled together with one or more reusable loose piece inserts in a predetermined relationship to define one or more inner casting surfaces of an article to be casted in the casting mold.

As shown in FIG. 3 a first movable core 10 according to the preferred embodiment of the invention includes a shaping portion 18 which is generally cylindrically shaped, and a mounting base 20 through which the core 10 will be fixed to the powered actuator 8 through welding, bolts, or other appropriate means. Additionally, the shaping portion 18 has parts of an interlocking mechanism or securing means defined therein which are adapted to cooperate with corresponding parts defined on the loose piece inserts 14, 16 as discussed further hereinbelow. The parts of the securing means on the shaping portion 16 include a first slot 22, a second slot 24, and a recess 26 with a magnet 28 disposed therein.

As shown, the slot 22 is preferably defined in a flat surface 23 and is in the shape of a dovetail slot which is adapted to securely receive a corresponding dovetail shaped projection 30 on loose piece 14 such that the loose piece 14 will be prevented from moving up and down or from side to side while an artice is being cast. Another flat surface 21 is defined at the inner end of the slot 22.

As shown, the slot 24 is defined in a flat surface 25 and is preferably tapered and adapted to receive a corresponding tapered projection 32 on one face of the loose piece insert 16. The slots 22, 24 preferably extend perpendicularly to each other on adjacent faces 21, 25 of the shaping portion 18.

The recess 26 is formed in a bottom surface of the slot 24, while the magnet 28 is disposed in the recess 26 such that the upper surface of the magnet is flush or slightly recessed from the bottom surface of a slot 24 so that it will not interfere with engagement between the surfaces of the slot 24 and of the projection 32 on loose piece 16. The tapered construction of the slot 24 and the projection 32 advantageously permits these parts to be easily joined together within the casting cavity from an exposed side of the shaping portion 18, yet also allowing the movable core 10 to be directly withdrawn from the casting cavity leaving the loose piece insert 16 in a cast part as discussed further below. The amount of taper for the slot 24 and the projection 32 is preferably in a range of 3°–10° per side. The slot 24 and the projection 32 function to securely hold the loose piece 16 and the movable core 10 in alignment during a casting process such that the loose piece insert 16 cannot move in a direction perpendicular to the longitudinal axis of the slot 24 and the projection 32.

The magnet 28 disposed in the recess 26 functions to hold the loose piece insert 16 in relative alignment with the movable core 10 while the other movable core 12 is being inserted during a mold assembly process. Once the movable core 12 is fully inserted into the casting cavity during mold assembly, the cores 10, 12 (as stably held by the actuators 8, 9) and the interfitting slots and projections, rather than the magnet 28, function to securely maintain the loose piece insert 16 in a predetermined relationship relative to the cores 10, 12. Similarly, once the cores 10, 12 are moved into position during a mold assembly process, the loose piece 14 is prevented from moving rearwardly out of the slot 22 because a rear face 29 of the loose piece 14 engages a corresponding face 33 of the loose piece 16 which is held immovably between the cores 10, 12. Also a flat face 27 of the loose piece 14 engages a flat face of the slot 22 when the loose piece 14 is inserted in the slot.

The loose piece insert 14 has a shaping surface 31 defined thereon, while the loose piece insert 16 has two shaping surfaces 34, 35 defined thereon. When the cores 10, 12 and the loose pieces 14, 16 are assembled together, shaping surface 31 of loose piece 14, shaping surface 35 of loose piece 16, and parts of the shaping sections 18,38 of cores 10, 12 extend continuously and smoothly together to define the inner radius of the substantially L-shaped casting surface defined collectively by the members 10, 12, 14 and 16; while shaping surface 34 of loose piece 16 and parts of the shaping sections 18, 38 of movable cores 10, 12 extend continuously and smoothly together to define the external radius of the substantially L-shaped casting surface.

The movable core 12 includes the shaping section 38 and an integral mounting base 40, which base 40 would be fixed to the other powered actuator 9 by welding, bolts or other appropriate means. The shaping section 38 has a flat face 41 with a tapered projection 42 extending therefrom, the tapered projection 42 being adapted to be slidably received by a slot 36 defined in a flat surface 37 of the loose piece 16 opposite to the surface 33 having the tapered projection 32 thereon. During a mold assembly process, while the loose piece 16 is held in engagement with the movable core 10 through the attracting forces of the magnet 28 on the projection 32 as disposed in slot 24, the movable core 12 will be moved or slid into the casting cavity by the actuator 9 such that the tapered projection is received by the tapered slot 36. The tapered projection 32 and the tapered slot 36 are both relatively long, and such lengthy tapered nature of these parts permits them to be easily and reliably aligned during the mold assembly process, noting that the magnet 28 does not strongly hold the loose piece 16 in engagement with a movable core 10 so that the loose piece 16 is easily and reliably shifted into an exact position between the movable cores 10, 12 as the tapered projection 42 is moved fully into the tapered slot 36. The amount of taper for the slot 36 and the projection 42 is preferably in a range of 3–10 degrees per side.

As will be understood, the interfitting relationship of the several slots 22, 24, 36 and the projections 30, 32, 42, and the disposition of the movable cores 10, 12 as securely maintained by the powered actuators, function to securely maintain the loose pieces 14, 16 in place in a predetermined engaging relationship while an article is being cast in the mold, such that the loose pieces 14, 16 cannot move in any of the three dimensions. Of course, engagement between the flat surfaces 21, 25, 27, 29, 33, 37, 39, 41 and 43 of the core members 10, 12 and the loose pieces 14, 16 also assist in securely maintaining the loose piece inserts 14, 16 in place during a casting process.

Mold Assembly Process:

The core members 10, 12 and the loose pieces 14, 16 according to the preferred embodiment of the invention will preferably be assembled in a casting cavity according to the following process.

Initially, a casting mold will be opened such that the ejector cavity 2 of the mold half 1 is exposed. The movable core 10 will then be moved by its powered actuator into the recess 4 of the ejector half 1; the loose piece 14 will be arranged on the core 10 by sliding the projection 30 into the slot 22; the loose piece 16 will arranged on the core 10 by sliding the projection 32 into the slot 24; and the core 12 will be moved or slid by its associated powered actuator into the opening 6 defined in the ejector half 1 such that the tapered projection 42 is securely received in the tapered slot 36. After the cores 10, 12 and loose pieces 14, 16 are assembled together, the other half of the ejector cavity (not shown) will be closed over the cavity 2 for fully enclosing the cores 10, 12 and the loose pieces 14, 16 between the two ejector halves.

An article will then be cast in the mold by flowing an appropriate molten material into the cavity, such as plastic, aluminum, or other appropriate materials.

After an article has been cast, the two halves of the casting mold will be opened up and the reusable core apparatus will be removed in the following sequence. Initially, core 12 will be withdrawn by the actuator 9 from the cast part, after which movable core 10 is withdrawn by its powered actuator from the cast part. This is easily and directly permitted because of the structure of the slots and the projections of the securing means, and will leave both of the loose pieces 14, 16 remaining in the cast part. The cast part will then be ejected from the mold, at which point such cast part may (if necessary) be quenched to cool before removing the loose pieces 14, 16.

To remove the inserts 14, 16 the cast part is secured with an appropriate securing means, after which one would tap on the cast part, preferably from the short or inside radius thereof, to disengage the loose pieces 14, 16 from the cast part, noting that such loose pieces will only be held in place by minor flash and shrink from the side of the part. The part may then be tipped up or rotated and the loose pieces 14, 16 will fall out of the cast part where they may easily be retrieved.

The above process may begin again using the same loose pieces 14, 16 in combination with the movable cores 10, 12. To decrease cycle time, however, it is preferred that multiple sets of the loose pieces 14, 16 will be used so that one set may be installed on the cores 10, 12 at the same time another set is being removed from a cast part.

As understood from the foregoing, the process of assembling the core apparatus parts 10, 12, 14, 16 in a casting mold involves a minimum number of simple movements, such that the process may be effected either manually or automatically with robots.

The apparatus and process according to the invention are very advantageous and desirable because the core apparatus for defining internal casting surfaces of the mold are completely reusable unlike the conventional casting apparatus. The fact that the core apparatus is reusable permits each of the parts 10, 12, 14, 16 of the core apparatus to be made of premium materials, such as heat treated steel, so that the parts will have a long life and will also permit production of high quality cast parts.

Similarly, the core apparatus according to the present invention is very advantageous and desirable because the means or mechanism used to secure the parts 10, 12, 14, 16 of the core apparatus in a predetermined relationship within the casting cavity has a very simple structure so that the parts 10, 12, 14, 16 can be rapidly assembled either manually or automatically during a mold assembly process, and may be similarly, rapidly disassembled for reuse after a part has been recast in the mold. Relatedly, the fact that the slots and the projections are formed integrally with the parts 10–16 minimizes the total number of parts necessary, facilitates assembly, and reduces the costs of both making the parts 10–16 and of using same.

Still further, the means for securing the parts 10, 12, 14, 16 in a predetermined engaging relationship also function to securely hold the assembled parts in a specific position within the casting cavity, so that high quality parts are consistently and reliable formed using the apparatus according to the invention.

Although there have been described what is at present considered to be the preferred embodiment of the invention, it will be understood that the invention can be embodied in other specific forms without departing from spirit or essential characteristics thereof. For example, the invention is not limited to casting apparatus including two core members disposed on powered actuators, and two loose pieces which would be assembled together with the movable cores to define a substantially L-shaped, tubular, inner casting surface within a casting cavity. Rather, reusable core apparatus according to the invention may include one or more cores disposed on powered actuators which may be joined together with one or more loose piece members in a predetermined relationship within a casting cavity of a mold to define one or more inner casting surfaces for parts to be cast in the mold. Further, although dovetail and tapered joints/recess are used for joining the several parts of core apparatus according to the preferred embodiment of the invention, other types of mechanical joint structures, including differently shaped slots, projections and recesses, could be used according to the invention. Still further, although the magnet is used for temporarily holding the parts 12, 16 of the core apparatus in temporary alignment according to the preferred embodiment of the invention, other temporary securing means could be used, especially in situations where the loose piece inserts are not constructed of steel.

The present embodiment is therefore considered in all aspects as illustrative and not restrictive. The scope of the invention is indicated by the appended claims rather than by the foregoing description.

We claim:

1. Reusable core apparatus for use in a casting mold having a casting member with a casting cavity defined therein, said core apparatus comprising:
   first core means for being disposed in the casting cavity to define a first internal casting surface;
   second core means for being disposed in said casting cavity to define a second internal casting surface;
   means for aligning said first and second core means during an assembly procedure and for selectively securing said first and second core means together in a predetermined engaging relationship in said casting cavity during a casting procedure;
   said aligning and securing means maintains said first and second core means in said predetermined engaging relationship while an article is being cast in the mold and releases said first and second core means from said predetermined engaging relationship after the article has been cast so that both said first and second core means may be reused in casting additional articles in the mold;
   said aligning and securing means consisting of cooperating joint members formed integrally with said first and second core means: and
   means for loosely maintaining said first and second core means in a temporary engaging relationship while said first core means is being positioned in said casting cavity, said loosely maintaining means includes a magnet disposed with one of said cooperating joint members for loosely attracting another of said cooperating joint members thereto.

2. Reusable core apparatus according to claim 1, wherein said securing means permits said first core means to be withdrawn from said casting cavity after a part has been cast in the casting cavity. While said second core means remains in the casting cavity in engagement with the cast part.

3. Reusable core apparatus according to claim 1, wherein said first core means comprises a pair of reciprocably movable cores movable into and out of said casting cavity, said second core means comprises at least one loose piece, and each said movable core and each said loose piece has at least one of said cooperating joint members formed integrally with a surface thereof.

4. Reusable core apparatus according to claim 3, wherein said movable cores cooperate with said securing means to securely maintain said second core means in said predetermined engaging relationship during a casting process.

5. Reusable core apparatus according to claim 4, including means for separately reciprocably moving each of said movable cores into and out of said casting cavity, each said loose piece is selectively, loosely fittable on one of said movable cores, and said aligning and securing means interconnects said first and second core means in said predetermined engaging relationship as at least one of the movable cores is moved into said cavity.

6. Reusable core means according to claim 1, wherein said cooperating joint members are formed integrally with surfaces of said first and second core means.

7. Reusable core apparatus according to claim 1, wherein said cooperating joint members include projections extending integrally from surfaces of one of said first and second core means and recesses defined in surfaces of the other of said second core means, said recesses securely receive said projections.

8. Reusable core apparatus according to claim 7, wherein said cooperating joint members are slidable with respect to each other, at least one of said cooperating joint members has a tapered surface to facilitate alignment with another of said cooperating joint members as the cooperating joint members are slid relative to each other from said temporary engaging relationship to said predetermined engaging relationship, and said tapered surface being formed in a sliding engagement surface of the corresponding cooperating joint member.

9. Reusable core apparatus according to claim 1, wherein said cooperating joint members comprise a projection and a recess shaped to interfittingly mate with each other, and said magnet is disposed with one of said recess and said projection.

10. Reusable core apparatus according to claim 1, wherein at least a pair of said cooperating joint members are slidable with respect to each other when said first and second core means are in said temporary engaging relationship for permitting said first and second core means to move from said temporary engaging relationship to said predetermined engaging relationship while said first core means is being positioned in said casting cavity and while the pair of said cooperating joint members are engaged with each other.

11. Reusable core apparatus for use in a casting mold having a casting member with a casting cavity defined therein, said core apparatus comprising:

first core means for being disposed in the casting cavity to define a first internal casting surface;

second core means for being disposed in said casting cavity to define a second internal casting surface;

means for aligning said first and second core means during an assembly procedure and for selectively securing said first and second core means together in a predetermined engaging relationship in said casting cavity during a casting, procedure;

said aligning and securing means maintains said first and second core means in said predetermined engaging relationship while an article is being cast in the mold and releases said first and second core means from said predetermined engaging relationship after the article has been cast so that both said first and second core means may be reused in casting additional articles in the mold;

said aligning and securing means consisting of cooperating joint members formed integrally with said first and second core means;

said first core means comprises a plurality of movable cores movable into and out of said casting cavity, said second core means comprises a plurality of loose pieces, each said movable core and each said loose piece having at least one of said cooperating joint members formed integrally therewith, and said securing means secures said movable cores and said loose pieces together in said predetermined engaging relationship: and means for loosely maintaining said first and second core means in a temporary engaging relationship during said assembly procedure.

12. Reusable core apparatus according to claim 11, wherein said movable cores are linearly movable into and out of said casting cavity, at least a pair of said cooperating joint members are slidable with respect to each other as one said movable core is moved into and out of said casting cavity, and at least one of said pair of cooperating joint members has a tapered surface to facilitate alignment with another of said cooperating joint members.

13. Reusable core apparatus according to claim 1, wherein said core apparatus is for casting metallic parts with an internal constant radius, said internal surface defined by said first core means produces an external side of the internal constant radius of a cast part, and said another casting surface defined by said second core means produces an internal side of the internal constant radius of the cast part.

14. A method for casting a part having an internal cast surface, comprising the steps of:

providing a casting member having a casting cavity therein;

providing first and second reusable core means, said second reusable core means including a pair of loose pieces;

providing means for aligning said first and second reusable core means during assembly together and for securing said first and second reusable core means together in a predetermined engaging relationship in said casting cavity while a part is being cast, said aligning and securing means consisting of cooperating joint members formed integrally with said first and second reusable core means;

partially positioning said first reusable core means in said cavity;

fitting said second reusable core means to said first reusable core means by engaging said cooperating joint members together in a temporary engaging relationship;

fully positioning said first reusable core means in said cavity such that said cooperating joint members are moved relative to each other out of said temporary engaging relationship into said predetermined engaging relationship to define an internal casting surface within said casting cavity;

casting a part in said casting cavity, said part having an internal cast surface defined by said first and second reusable core means; and removing said first reusable core means from said part and said casting cavity independently of said second reusable core means.

15. A method according to claim 14, wherein said first reusable core means is reciprocably movable into and out of said casting cavity said cooperating joint members are slidable with respect to each other, said second reusable core means is fittable to said first reusable core means by slidably engaging said cooperating joint members together, and said cooperating joint members maintain said first and second reusable core means in said predetermined relationship while said part is being cast and slidably release said first and second reusable core means from said predetermined engaging relationship when said first reusable core means is removed from said casting cavity.

16. A method according to claim 14, wherein said method is for casting metallic parts and includes a further step of providing means for loosely maintaining said cooperating joint members in said temporary engaging relationship, said loosely maintaining means includes a magnet disposed with one of said cooperating joint members for loosely attracting another of said cooperating joint members thereto.

17. A method according to claim 14, wherein said first core means comprises a pair of movable cores, reciprocably movable into and out of said casting cavity; each said loose piece selectively fittable on one of said movable cores, each said movable core and loose piece has a cooperating joint member formed on a surface thereof; and at least a pair of said cooperating joint members has tapered surfaces to facilitate alignment and sliding engagement therebetween.

18. Reusable core apparatus according to claim 3, wherein said second core means comprises a pair of loose pieces, and one of said loose pieces has a pair of said cooperating joint members on surfaces thereof and is slidable with respect to each of said pair of movable cores when said first and second reusable core means are moved from said temporary engaging relationship to said predetermined engaging relationship.

19. Reusable core apparatus according to claim 1, wherein said cooperating joint members include respective engagement surfaces which are slidable with respect to each other as said first and second core means are moved from said temporary engaging relationship to said predetermined engaging relationship.

* * * * *

UNITED STATES PATENT AND TRADEMARK OFFICE
CERTIFICATE OF CORRECTION

PATENT NO.   :   5,385,705
DATED        :   January 31, 1995
INVENTOR(S) :   Malloy et al.

It is certified that error appears in the above-indentified patent and that said Letters Patent is hereby corrected as shown below:

Column 1, line 18, the word "Further" should be the start of a new paragraph.

Column 2, line 65, change "to-provide" to --to provide--.

Column 3, line 4, the word "It" should be the start of a new paragraph.

Column 8, line 14 (Claim 2, line 4), change "cavity. While" to --cavity while--;
Column 8, line 37 (Claim 6, line 1), change "means" to --apparatus--.

Column 10, line 25 (Claim 15, line 3), after "cavity" insert a comma;
Column 10, line 47 (Claim 17, line 4), after "piece" insert --is--.

Signed and Sealed this

Eleventh Day of April, 1995

*Attest:*

BRUCE LEHMAN

*Attesting Officer*          *Commissioner of Patents and Trademarks*